United States Patent

Ronin

(10) Patent No.: US 6,818,058 B2
(45) Date of Patent: Nov. 16, 2004

(54) METHOD FOR THE TREATMENT OF FLY ASH

(75) Inventor: Vladimir Ronin, Luleå (SE)

(73) Assignee: Procedo Enterprises Etablissement, Vaduz (LI)

( * ) Notice: Subject to any disclaimer, the term of this patent is extended or adjusted under 35 U.S.C. 154(b) by 36 days.

(21) Appl. No.: 10/426,916

(22) Filed: Apr. 30, 2003

(65) Prior Publication Data

US 2004/0089202 A1 May 13, 2004

(30) Foreign Application Priority Data

Nov. 7, 2002 (SE) ............................................. 0203288

(51) Int. Cl.⁷ .............................................. C04B 18/06
(52) U.S. Cl. .................................. 106/705; 106/DIG. 1
(58) Field of Search ............................ 106/705, DIG. 1

(56) References Cited

U.S. PATENT DOCUMENTS

| | | | |
|---|---|---|---|
| 5,121,795 A | 6/1992 | Ewert et al. ................. 166/292 |
| 5,383,521 A | 1/1995 | Onan et al. .................. 166/293 |
| 5,714,002 A | 2/1998 | Styron ......................... 106/705 |
| 5,714,003 A | 2/1998 | Styron ......................... 106/705 |
| 5,804,175 A | 9/1998 | Ronin et al. ................. 106/757 |
| 6,038,987 A | 3/2000 | Koshinski .................... 110/344 |

FOREIGN PATENT DOCUMENTS

EP  0 696 262 B1  2/1996

*Primary Examiner*—Paul Marcantoni
(74) *Attorney, Agent, or Firm*—Alfred J. Mangels

(57) ABSTRACT

A method for treatment of fly ash for incorporation into and for preparation of mortars and concretes. Fly ash is intensively blended with a highly reactive and dry cement mixture that is obtained by mixing Portland cement with a microfiller and possibly a water reducing agent. The blend of fly ash and Portland cement is then ground in a vibratory milling device to achieve a final product fineness having a particle size to provide retention on a 45 $\mu$m sieve of less than 15 percent by weight of the blend.

14 Claims, No Drawings

METHOD FOR THE TREATMENT OF FLY ASH

BACKGROUND OF THE INVENTION

1. Field of the Invention

The present invention relates to the method for treatment of fly ash which is useful for production of concretes, mortars, and other mixtures comprising cement and fly ash. Fly ash manufactured according to the present method significantly improves performance of the concrete and provides higher level of replacement of standard Portland cement, which leads to significant economical and environmental benefits.

2. Description of the Related Art

Fly ash is a by-product of a coal burning power plant and is produced worldwide in large quantities each year.

Fly ash usually contains about 85% glassy, amorphous components. According to ASTM C 618 fly ash is classified in two classes, Class C and Class F. The Class F fly ash typically contains more than 70% by weight of silica, alumina, and ferric oxides, while Class C typically contains between 70% and 50%. Class F is produced as a by-product of the combustion of bituminous coal. Class C fly ash has a higher calcium content and is produced as a by-product of the combustion of sub-bituminous coal.

In 1988, approximately 84 million tons of coal ash were produced in the U.S. in the form of fly ash (ca 60.7%), bottom ash (ca 16.7%), boiler slag (5.9%), and flue gas desulphurization (16.7%), see, e.g., Tyson, 1990, *"Coal Combustion By-Product Utilization"*, Seminar, Pittsburgh, 15 pp. Out of the approximately 50 million tons of fly ash generated annually, only about 10 percent is used in concrete, see, e.g., *ACI Committee* 226. 1987, *"Use of Fly Ash In Concrete,"* ACI 226.3R-87, *ACI J. Proceedings* 84:381–409), while the remaining portion is mostly deposited as waste in landfills.

Comprehensive research demonstrated that high volume fly ash concretes showed a higher long term strength development, a lower water and a gas permeability, a high chloride ion resistance, etc., in comparison with Portland cement concretes without fly ash.

At the same time, high volume fly ash concrete has significant drawbacks: a very long setting time and a very slow strength development during the period 0 to 28 days, which reduce the level of fly ash used for replacement of Portland cement to an average of 15–20%.

A number of efforts have been made towards improvement of the performance of high volume fly ash concretes; see, e.g., *Malhotra, Concrete International J.*, Vol. 21, No. 5, May 1999, pp. 61–66. According to Malhotra, strength development of such concretes could be improved by significantly increasing the binder content (cement+microfiller) and significantly decreasing the amount of mixed water, but such an approach requires increased dosage of water reducing admixtures to keep an acceptable consistency of concrete mixtures, which sharply increases the cost of the concrete.

A number of methods related to grinding fly ash in order to improve its pozzolanic activity, which increases the amount of fly ash particles of the size of about 11 microns and by simultaneous introduction of calcium oxide, have been developed, see U.S. Pat. Nos. 6,038,987; 5,714,002; 5,714,003; 5,383,521, and 5,121,795. All mentioned known methods could not provide significant improvement of the fly ash performance as a concrete component, and they drastically increase the costs of pozzolan additive.

SUMMARY OF THE INVENTION

The present invention relates to a method for treatment of fly ash for preparation of mortars and concretes. In a first step fly ash is intensively blended with a highly-reactive and dry cement mixture, which mixture has been obtained by mixing Portland cement with a microfiller and possibly a water reducing agent and by grinding said mixture. In a second stage the so-obtained blend is interground in a vibratory milling device to achieve the fineness of the final product, with a retention on a 45 $\mu$m sieve of less than 15 percent by weight.

According to a preferred embodiment, said milling device has a vibration cycle having an amplitude of from 2 to 30 mm and a frequency of vibration from 800 to 2000 rpm.

DESCRIPTION OF THE PREFERRED EMBODIMENTS

The present invention thus relates to a method for treatment of fly ash useful for preparation of mortars and concretes, where the fly ash is first intensively blended with a highly-reactive and dry cement-mixture, which mixture has been obtained by thorough mixing of Portland cement with a microfiller and possibly a water reducing agent, and the blend is then interground in a vibratory milling device.

Intergrinding of the fly ash with the highly reactive cement mixture in a milling device with a vibration cycle having an amplitude of from 2 to 30 mm and a frequency of vibration of from 800 to 2000 rpm leads to a several effects.

The effects are first an increase of the fineness of the final product takes place, where a reduction of the average size of fly ash particles is obtained, so that the amount of fly ash retained on a 45 $\mu$m sieve will be less than 15 percent by weight. Second, additional amorphization of the fly ash particle surface takes place. Third, tri-and dicalcium silicates from the highly-reactive cement mixture become homogeneously distributed on the surfaces of the fly ash particles. These phenomena improve the pozzolanic activity towards a reaction with calcium hydroxide; in addition they also create an inherent hydraulic activity of the treated fly ash.

Another advantage with the present method is that the grinding process appears to release ammonia captured in the surface of the fly ash produced from urea-treated coal, which is used to reduce $NO_x$ emissions. The presence of ammonia in fly ash renders it unsuitable for use in concretes or mortars.

This advantage of the present invention is that the proposed treatment of fly ash minimizes the effects of boiler conditions on fly ash properties associated with boiler conditions and the degree of coal pulverization.

By a highly-reactive, dry cement mixture according to the foregoing is meant a cement mixture of the kind obtained by the process described in European Patent Specification No. EP 0696262 and in U.S. Pat. No. 5,804,175, or a cement mixture that has been treated in accordance with a corresponding process so as to obtain a compressive strength corresponding to that recited in EP 0696262 and U.S. Pat. No 5, 804,175.

According to one preferred embodiment a water reducing agent is introduced in a powdery form in an amount from about 0.1 to 0.3 percent by weight during intergrinding.

According to another preferred embodiment, the fly ash is caused to replace the cement in the fly ash-cement mixture from about 20 to about 70 percent by weight of the total weight of the mixture.

The European Patent Specification No. EP 0696262 and U.S. Pat. No 5,804,175 describe a method of producing cement that can be used to produce a cement that can be used to produce pastes, mortar, concrete, and other cement-based materials of high bearing capacity with a reduced water content, a high mechanical strength and a density, and a rapid strength development. This method includes the mechanical-chemical treatment of a mixture of cement and at least one of two components, wherein the first component is a microfiller that contains silicon dioxide and the second component is a polymer in the form of water reducing agent. The cement and the first and/or the second component are mixed in the first stage in a dry state, wherein the particles in the first and/or the second component are adsorbed on the cement particles. The mixture obtained in the first stage is treated in the second stage in a grinder with vibrating grinding media in which the particles in said mixture are subjected to a large number of impact impulses which change directions in a rapid sequence, and thereby result in modification of the surface properties of cement particles in the form of considerable increase in surface energy and chemical reactivity.

The duration of treatment in the second stage is sufficient for a cement paste cube having a side length of 20 mm, and compacted thoroughly under vibration and cured at +20 degrees C. under sealed conditions, to obtain a one-day compressive strength equal to at least 60 MPa.

The European Patent No 0696262 is hereby incorporated in the present application.

According to a preferred embodiment the blend of fly ash and the highly reactive cement mixture contains fly ash from about 99 to about 90 percent by weight.

Further, the invention relates to a process for producing concrete mixtures useful for preparing shaped concrete elements or structures. The process comprises the steps of first producing a treated fly ash according to the above-described method and, and, second, mixing the blended cement with sand and/or aggregate of greater dimensions and water, and, third, casting a shaped element or a structure and hardening of the subject.

In this respect, it is preferred that the fly ash replaces the cement in the fly ash-cement mixture in the amount of from about 20 to about 70 percent by weight of the total weight of the mixture.

The present invention will be described in greater detail in the following, partly in connection with Tables, where Tables 1 and 2, respectively, show the strength development of the mortars relative to Portland cement, and with 20 and 40 percent by weight of Portland cement replacement by fly ash Class F and Class C treated according to the present method.

The tables contain data for the mortars with similar levels of Portland cement replacement, where fly ash has been introduced by only intermixing with other ingredients of the mortar in a traditional way. Tests have been performed according to ASTM C 109, ASTM C 311 and ASTM C 192.

According to the results obtained, mortars prepared with 20 and 40% replacement of Portland cement with fly ash Class F showed a significant increase in strength, both early-age and long-term, in comparison with traditional blends. The mortar with 20% replacement reached a strength level of the pure Portland cement about 3 days after hardening, and demonstrates about an 11% higher strength after 28 days of curing. The mortar with 40% replacement almost reached the strength of the pure Portland cement mortar after 28 days of curing.

Mortars prepared with fly ash Class C treated according to the method disclosed herein showed a similar tendency of strength development improvement. The strength of the mortar with 20% replacement of Portland cement showed a superior strength compared to pure Portland cement mortar already after 3 days, and about a 12% higher strength after 28 days of hardening.

Measurement of the setting time of binders containing treated fly ash and the reference Portland cement paste using the Gilmore apparatus have been made according to ASTM C 266. Data showed that the cement pastes with treated fly ash demonstrated a setting time in line with the reference Portland cement: initial setting time 2:20–2:40 hours and final setting time 3:40–3:55 hours.

It was discovered that fly ash Class F and Class C interground with a highly-reactive cement mixture in a vibratory milling device, where the milling device has a vibration cycle having an amplitude of from 2 to 30 mm and a frequency of vibration of from 800 to 2000 rpm, resulted in a fineness of the final product where the retention on a 45 $\mu$m sieve is less than 5 percent by weight. This leads to a significant modification of the surface of the fly ash resulting in additional amorphization and adsorption of the particles of the highly-reactive cement mixture. This modification leads to an improvement of the chemical reactivity of the fly ash and improvement of the performance of the fly-ash-containing composites.

According to a first embodiment the fly ash consists essentially of Class F fly ash.

According to a second embodiment the fly ash consists essentially of Class C fly ash.

According to a third embodiment the fly ash consists essentially of a blend of Class F and Class C fly ash.

According to a fourth embodiment the fly ash consists essentially of a blend of Class F fly ash, Class C fly ash, and/or lignite fly ash.

EXAMPLES

The following materials have been used in the experiments described below:

Standard Portland cement CEM 142.5 according to EN-197 or Type I according to ASTM C 150, fly ash Class F and Class C.

The fineness of the fly ash Class F and Class C are characterized by the retention on the 45 micron sieve of 21 and 19.5 percent by weight, respectively.

The fly ash was mixed in a dry state with a highly reactive dry cement mixture produced according to European Patent Specification No. EP 0696262 and containing 99% of Portland Cement (PC) and 2% of fly ash Class F. The mixing of the said components was performed with a "Tonimix" mixer (Made in Germany) having a rotational speed of 280 rpm during 3 min to obtain a homogeneous blend. The content of fly ash and highly reactive cement mixture were 95 percent by weight and 5 percent by weight, respectively.

The intergrinding of the above mentioned mixtures was carried out in a Humboldt Palla 20U (Humboldt, Germany) vibrating mill with amplitude 10 mm and a frequency of vibration of from 1500 rpm to achieve the fineness of the final product where the 45 micron fraction was about 2.5 percent by weight.

According to the test results, see Tables 1 and 2, the fly ash, Class C and Class F, treated according to the present method demonstrated a significant improvement in performance. This can lead to an increase in utilization of the fly ash in concrete and also by an increased level of replacement of Portland cement by fly ash in concrete. This will have a significant impact on the environmental profile of cement and concrete industry.

TABLE 1

Mortar test with Class F fly ash

| Cement Type | Compressive Strength, MPa Curing Time, days | | | |
|---|---|---|---|---|
| | 1 | 3 | 7 | 28 |
| Reference Portland Cement | 10.2 | 26.5 | 30.0 | 38.6 |
| 80% PC + 20% fly ash* | 8.5 | 25.0 | 32.5 | 43.1 |
| 60% PC + 40% fly ash* | 6.4 | 19.5 | 24.1 | 36.2 |
| 80% PC + 20% fly ash** | 6.5 | 20.0 | 23.6 | 35.8 |
| 60% PC + 40% fly ash** | 3.8 | 15.0 | 17.7 | 29.6 |

*Fly ash treated according to the method disclosed herein
**Fly ash traditionally introduced in mixer

TABLE 2

Mortar test with Class C fly ash

| Cement Type | Compressive Strength, MPa Curing Time, days | | | |
|---|---|---|---|---|
| | 1 | 3 | 7 | 28 |
| Reference Portland Cement | 10.2 | 26.5 | 30.0 | 38.6 |
| 80% PC + 20% fly ash* | 9.5 | 27.0 | 35.3 | 46.2 |
| 60% PC + 40% fly ash* | 7.4 | 21.5 | 27.2 | 38.2 |
| 80% PC + 20% fly ash** | 7.5 | 22.0 | 28.3 | 39.8 |
| 60% PC + 40% fly ash** | 4.8 | 17.0 | 19.7 | 32.6 |

*Fly ash treated according to the method disclosed herein
**Fly ash traditionally introduced in mixer Due to a significant reduction of Portland clinker content, implementation of such blended cements could significantly reduce the level of carbon dioxide and other "greenhouse" gas emissions, where the reduction could be more than 50%, and also the amount of energy required for Portland clinker production.

What is claimed is:

1. A method for treatment of fly ash for preparation of mortars and concretes, said method comprising the steps of:
    blending fly ash with a highly-reactive and dry cement mixture, wherein the cement mixture is obtained by mixing Portland cement with a microfiller and by grinding said cement mixture, and
    grinding the blend in a vibratory milling device to achieve a particle fineness of the ground product that provides a retention on a 45 $\mu$m sieve which is less than 15 percent by weight.

2. A method according to claim 1, wherein the milling device has a vibration cycle having an amplitude of from 2 to 30 mm and a frequency of vibration of from 800 to 2000 rpm.

3. A method according to claim 1, wherein the blend of fly ash and highly reactive cement mixture contains from about 99 to about 90 percent fly ash by weight.

4. A method according to claim 1, wherein the fly ash consists essentially of Class F fly ash.

5. A method according to claim 1, wherein the fly ash consists essentially of Class C fly ash.

6. A method according to claim 1, wherein the fly ash consists essentially of a blend of Class F fly ash and Class C fly ash.

7. A method according to claim 1, wherein the fly ash consists essentially of a blend of Class F fly ash, Class C fly ash, and lignite fly ash.

8. A method according to claim 1, including the step of introducing during the grinding step a water reducing agent in a powdery form and in an amount of from about 0.1 to 0.3 percent by weight of the blend.

9. A method according to claim 1, wherein the fly ash consists essentially of a blend of Class F fly ash, Class C fly ash, and lignite fly ash, and including the step of replacing cement in the fly ash-cement mixture to provide a mixture having from about 20 to about 70 percent fly ash by weight of the total weight of the mixture.

10. A method according to claim 1, wherein the highly reactive cement is obtained by mixing in a first stage a dry state cement and a component selected from the group consisting of a microfiller that contains silicon dioxide and a polymer in the form of a water reducing agent, wherein particles of the component are adsorbed on the cement particles, and treating the mixture obtained in the first stage in a second stage in a grinder with vibrating grinding media in which particles in the mixture are subjected to a large number of impact impulses which change directions in a rapid sequence to result in modification of surface properties of cement particles in the form of an increase in surface energy and chemical reactivity.

11. Method A method for producing a concrete mixture for preparing concrete structures and elements,
    said method comprising the steps of:
    blending fly ash with a highly-reactive and dry cement mixture, wherein the cement mixture is obtained by mixing Portland cement with a microfiller and by grinding said cement mixture,
    grinding the blend in a vibratory milling device to achieve a particle fineness of the around product that provides a retention on a 45 $\mu$m sieve which is less than 15 percent by weight, and
    mixing said fly ash and cement mixture with water and a component selected from the group consisting of sand of greater particle dimensions, aggregates of greater particle dimensions, and mixtures thereof.

12. A method according to claim 1, including the step of adding a water reducing agent to the Portland cement and microfiller mixture.

13. A method according to claim 11, including the step of mixing with the fly ash and cement mixture an air entraining admixture.

14. A method according to claim 11, including the step of mixing with the fly ash and cement mixture a water reducing admixture.

* * * * *